(12) United States Patent
Newmeister

(10) Patent No.: US 10,107,002 B1
(45) Date of Patent: Oct. 23, 2018

(54) AUTOMATED GIRTH FITTER AND SHIM REMOVER

(71) Applicant: NewCon, LLC, Tulsa, OK (US)

(72) Inventor: John Newmeister, Tulsa, OK (US)

(73) Assignee: NewCon, LLC, Tulsa, OK (US)

( * ) Notice: Subject to any disclaimer, the term of this patent is extended or adjusted under 35 U.S.C. 154(b) by 0 days.

(21) Appl. No.: 15/842,465

(22) Filed: Dec. 14, 2017

Related U.S. Application Data

(60) Provisional application No. 62/442,185, filed on Jan. 4, 2017.

(51) Int. Cl.
| | | |
|---|---|---|
| *E04H 7/06* | (2006.01) | |
| *E04H 7/30* | (2006.01) | |
| *E04G 17/14* | (2006.01) | |
| *E04G 3/24* | (2006.01) | |
| *B23K 37/053* | (2006.01) | |

(52) U.S. Cl.
CPC ............... *E04H 7/06* (2013.01); *E04G 3/24* (2013.01); *E04G 17/14* (2013.01); *E04H 7/30* (2013.01); *B23K 37/053* (2013.01)

(58) Field of Classification Search
CPC .. E04H 7/06; E04H 7/30; E04G 21/00; E04G 3/24; B23K 9/0206; B23K 37/0223; B23K 37/02; B23K 37/0282
USPC .................................................... 228/146, 44
See application file for complete search history.

(56) References Cited

U.S. PATENT DOCUMENTS

| | | | | |
|---|---|---|---|---|
| 1,821,410 | A * | 9/1931 | Taylor .................. | B21J 15/10 219/126 |
| 2,752,468 | A * | 6/1956 | Costello ............... | B23K 9/0206 219/126 |
| 2,761,954 | A * | 9/1956 | Westfall ............... | B23K 9/0206 219/126 |
| 2,763,770 | A * | 9/1956 | Arnold ................. | B23K 9/0206 219/126 |
| 2,781,441 | A * | 2/1957 | Ballentine, Jr. ...... | B23K 9/0206 219/126 |
| 2,794,901 | A * | 6/1957 | Christensen ......... | B23K 9/0209 219/126 |
| 2,806,935 | A * | 9/1957 | Meyer .................. | B23K 9/0206 219/126 |
| 2,916,605 | A * | 12/1959 | Lucas .................. | B23K 9/0206 219/126 |
| 2,949,527 | A * | 8/1960 | Lucey .................. | B23K 9/0206 219/126 |
| 3,241,229 | A * | 3/1966 | Turbett ................ | B23K 9/0209 219/126 |
| 3,455,495 | A * | 7/1969 | Vest ..................... | B23K 9/0206 219/126 |
| 3,779,444 | A * | 12/1973 | Kensrue ............... | B23K 9/0256 219/124.31 |
| 3,818,172 | A * | 6/1974 | Larsson ............... | B23K 11/061 219/101 |

(Continued)

*Primary Examiner* — Erin B Saad
*Assistant Examiner* — Carlos Gamino
(74) *Attorney, Agent, or Firm* — Gable Gotwals

(57) ABSTRACT

Embodiments of an automatic girth fitter system use a device or devices to automate the alignment of horizontal weld seams in both shop- and field-built tanks or vessels. The automated system device or devices may also be used to remove shims that are used to gap the horizontal weld seams and provide plate alignment prior to fitting or welding those seams.

19 Claims, 8 Drawing Sheets

(56) References Cited

U.S. PATENT DOCUMENTS

| | | | | |
|---|---|---|---|---|
| 3,838,496 | A * | 10/1974 | Kelly | B23K 9/0209 |
| | | | | 228/213 |
| 3,870,853 | A * | 3/1975 | Reinhardt | B23K 9/0256 |
| | | | | 219/124.31 |
| 4,432,128 | A * | 2/1984 | Pechacek | B01J 3/048 |
| | | | | 182/187 |
| 6,266,862 | B1 * | 7/2001 | Oostwouder | B23K 31/02 |
| | | | | 228/49.1 |
| 6,282,863 | B1 * | 9/2001 | Christian | E04H 7/06 |
| | | | | 52/747.1 |
| 7,500,592 | B1 * | 3/2009 | Petricio Yaksic | E04H 7/06 |
| | | | | 228/184 |
| 2010/0276408 | A1 * | 11/2010 | Martin | B23K 37/0223 |
| | | | | 219/148 |
| 2015/0258641 | A1 * | 9/2015 | Stermann | B23K 20/12 |
| | | | | 228/2.1 |

* cited by examiner

AUTOMATED GIRTH FITTER AND SHIM REMOVER

CROSS-REFERENCE TO PENDING APPLICATIONS

This application claims priority to U.S. 62/442,185, filed Jan. 4, 2017, for Automated Girth Fitter and Shim Remover.

BACKGROUND

1. Field of the Invention

Embodiments of this disclosure relate to devices for holding in a curved configuration or fitting metal plates into a cylindrical tank as the tank is being constructed. Embodiments may also be provided with means for removing from between metal plates the spacing shims used to hold the metal plates in the proper spaced apart relationship while they are being tacked or welded in place during the construction of a tank.

2. Description of the Related Art

Current technology for fitting horizontal weld seams in shop or field built tanks and vessels uses a manual system of shims, wedges, pins, key plates, bull pins, u-bars, leaf springs, hammers, and other accessories, some of which are tack welded or welded to the plates to be aligned. This system is very labor intensive, has high material cost, and is time consuming.

The construction of large cylindrical tanks involves first establishing a circular base onto which horizontal shell plates of metal are to be welded to create a tank. Once the base is established, the first horizontal row of metal shell plates are tacked or welded to the perimeter of the base so that the first horizontal row of metal plates are oriented perpendicular to the base and form a complete cylinder around the base.

Once the first row of shell plates has been welded in place, the fitting of subsequent rows of metal shell plates becomes more difficult since the metal plates now must be lifted upward and placed on top of the first row of welded plates. What makes this even more difficult is that the metal plates forming the second and subsequent rows on the tank must be flexed to fit the curvature or girth of the first row and must be spaced properly from the next lower row of plates so that they can be welded together. All of this is done above the base level and at an ever increasing height above the base level as the tank nears completion of its final height.

Generally, the vertical seams of the plates are welded together and then the horizontal seams of the plates are fitted and/or welded together. Shims are used to hold the plates in the proper spacing and alignment to be welded, but must be removed during the welding process.

Up until now, the flexing of the metal plates to align the new plates with the girth of the next lower row of plates has been accomplished manually. Likewise, the placement of shims to achieve the proper gap and alignment between plates for fitting and/or welding and the removal of those shims from between the plates has also been accomplished manually.

Currently there are automatic welding machines that automate the welding process for tanks, but there is still a need for an automated plate girth alignment and fitting device and for an automated shim removal device for removing shims as the plates are being welded.

Embodiments of this disclosure address these needs by providing a device or devices for aligning the new plates vertically with the girth of the plates of the next lower row on the tank. Optionally, the device can be provided with equipment for automatically removing shims from between the new plate and the plates of the next lower row as the welding process proceeds. This device can be a stand-alone piece of equipment or can be incorporated into an existing automatic girth welding machine that is designed for a tank welding operation.

These new devices are being developed to reduce labor input and material costs as well as to shorten the time required to perform plate alignment, while improving plate alignment accuracy and safety in horizontal weld seam fitting and welding operations.

SUMMARY

Embodiments of this disclosure provide an automated system using a device or devices to automate the alignment of horizontal weld seams in both shop and field built tanks or vessels prior to being tacked welded or final welded. The automated system device or devices may also be used to remove shims that are used to gap weld seams and provide plate alignment prior to welding horizontal seams.

The device moves along the top of a plate on support rollers. The device is supported in a vertical position, and can move horizontally on the top of the shell plate. The device may be manually or mechanically moved around the tank or vessel. The device uses one or more rams or other mechanical methods to force accurate vertical alignment of the plates prior to being tacked or final welded. The rams can be powered by compressed air, electrical means, or other mechanical methods.

The device may include equipment for removing and collecting shim plates and pins preventing them from falling, and thus increasing the safety of the operation.

The alignment device can be solid blocks or rollers and can have different profiles or pressures to force plate alignment to be flush inside, flush outside, or centered on top of each other.

DETAILED DESCRIPTION

Embodiments of a girth weld fitter of this disclosure include a plate alignment ram located at a lower end of a vertical post that will travel along the interior side of the tank and, opposite this ram, is a block located at a lower end of the vertical post that will travel along the exterior side of the tank. The block may be a pillow block or a solid block and may include a pair of rollers having different diameters than one another. The ram, which may be an electric, hydraulic, or pneumatic ram, may be mounted on a horizontal plate and can include a pillow block on its plate-facing end. By moving the ram toward or away from the plate, accurate vertical alignment of the plates can be achieved prior to being tacked or final welded.

In some embodiments, the vertical post is a girth welder beam. In other embodiments, the vertical post is part of a horse collar that includes two spaced-apart vertical posts connected at their upper end by horizontal frame member to form a T-shape. Located at each end of the horizontal frame member is a roller configured to follow along a top edge of plates to be aligned vertically with the girth of the plates of the next lower row of the tank. The rollers may be powered by means known in the art for the girth fitter to travel along the top edge. In some embodiments. The rollers typically include at least one V-shaped groove sized to receive plates in a range of thicknesses up to any including 1½".

In embodiments, the girth weld fitter may include a shim remover ram connected to the lower end of the interior side vertical post and spaced apart in a horizontal direction from the plate alignment ram. Like the plate alignment ram, the shim extractor ram may be mounted on a horizontal plate. A shim extractor located on a plate-facing end of the ram includes a slot sized to capture the shims as the girth weld fitter travels about the top edge, with the ram entering the extractor and pushing the captured shims through the exterior side of the tank. Typically, these shims maintain a gap in range of ⅛-inch to 3/32-inch. In some embodiments, the slot is wider toward a leading end than a trailing end of the slot, and may be tapered toward the trailing end. The shim extractor ram may be an electric, hydraulic, or pneumatic ram. In some embodiments, a basket is provided opposite the shim remover ram at the lower end of the exterior side vertical post to catch the pushed-out shims.

Figure 1:
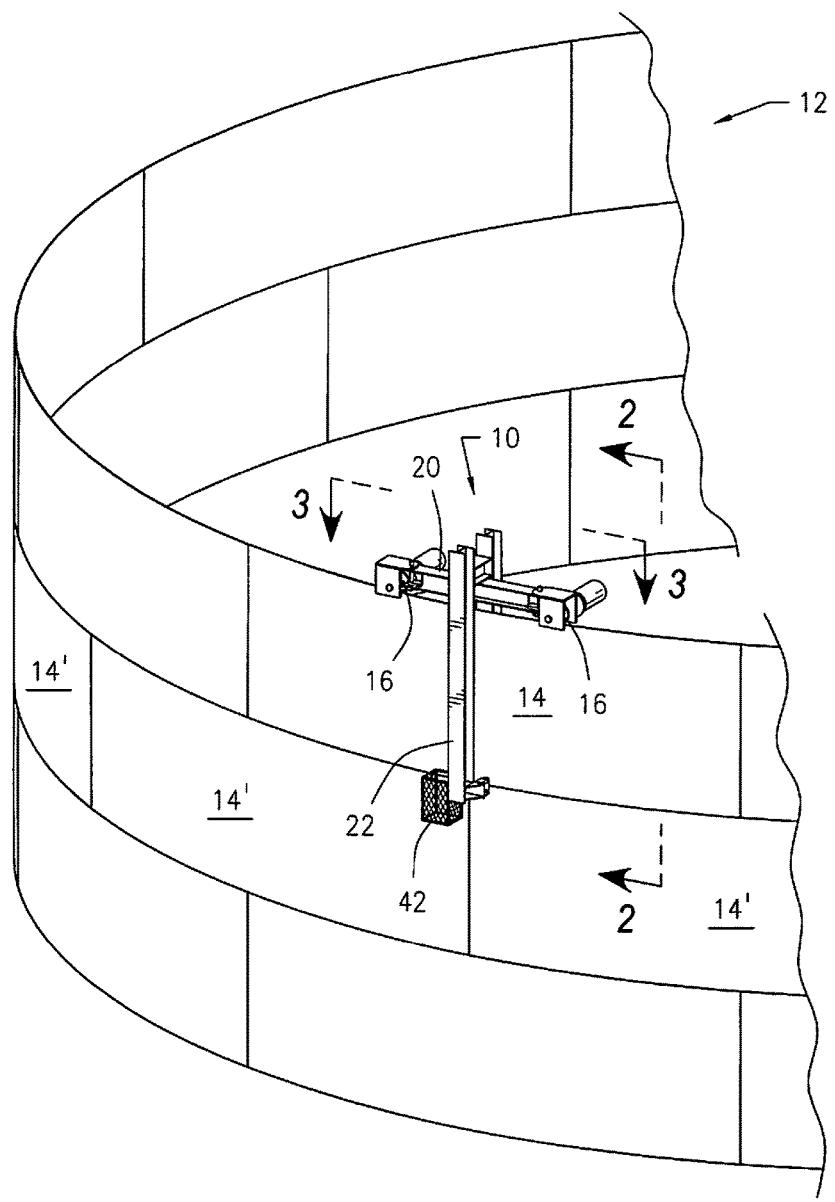
FIG. 1 is a tank shown under construction with the use of an automated girth fitter and shim remover device that is constructed in accordance with an embodiment of this disclosure.

Referring now to the drawings and initially to FIG. 1, there is illustrated an automated girth fitter and shim removal device 10 that is constructed in accordance with an embodiment this disclosure. That device 10 is shown in FIG. 1 in use in the construction of a tank 12. The device 10 rests on a plate 14 that is being added to the tank 12 and rolls on supporting rollers 16 provided on device 10. These rollers 16 can be seen in FIG. 2 and the drive mechanism 18 for those rollers 16 is shown in FIG. 3.

As illustrated in FIGS. 1, 2, 3, 7A, and 7B, the drive mechanism 18 is supported on a horizontal frame member 20 to which a pair of vertical beams, posts or pipes 22 attach. The vertical beams 22 are spaced apart from each other so that they straddle the plate 14 that is being added to the tank 12 and extend downward past the horizontal junction 24 where a lower edge 26 of the plate 14 that is being added meets the horizontal surface 28 of the plates 14' comprising the row of plates directly below the plate 14 on the tank 12.

Referring now to FIGS. 2, 4, 7A and 7B, one of the vertical beams or pipes 22 is supplied with a block 46 (e.g., pillow blocks or solid blocks) with rollers 30 that engage the tank 12 at the junction 24 where the plate 14 that is being added to the tank 12 meets the horizontal surface 28 of the plates 14' in the row directly below. The other vertical beam or pipe 22 is provided with the rams 32 and 34 which push toward the opposite vertical beam or pipe 22 when activated.

Figure 4:
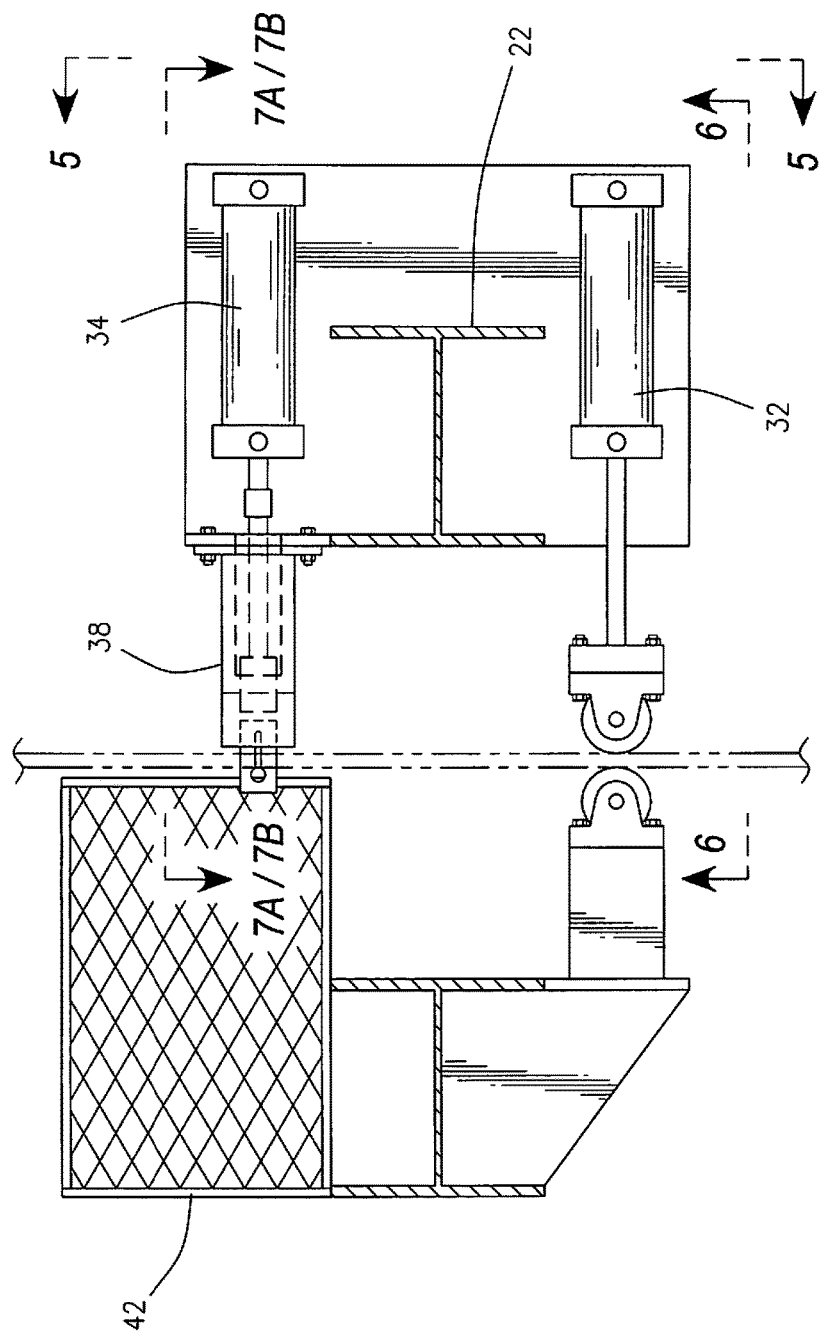
FIG. 4 is a cross sectional view taken along line 4-4 of FIG. 2 showing the rams.
Figure 5:
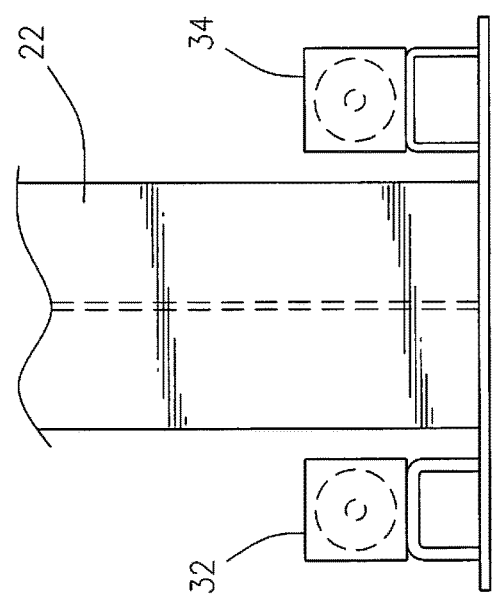
FIG. 5 is an end view of the rams taken along line 5-5 of FIG. 4.

The rams 32 and 34 are shown in FIGS. 4 and 5 and are of two types: an alignment ram 32 for aligning the plates 14 vertically with plates 14', and a shim remover ram 34 for pushing shims 36 out from between the horizontal junction 24 between the plate 14 and plates 14'. The alignment ram 32 may include a roller or a pillow block 33 at its plate-facing end.

Figure 2:
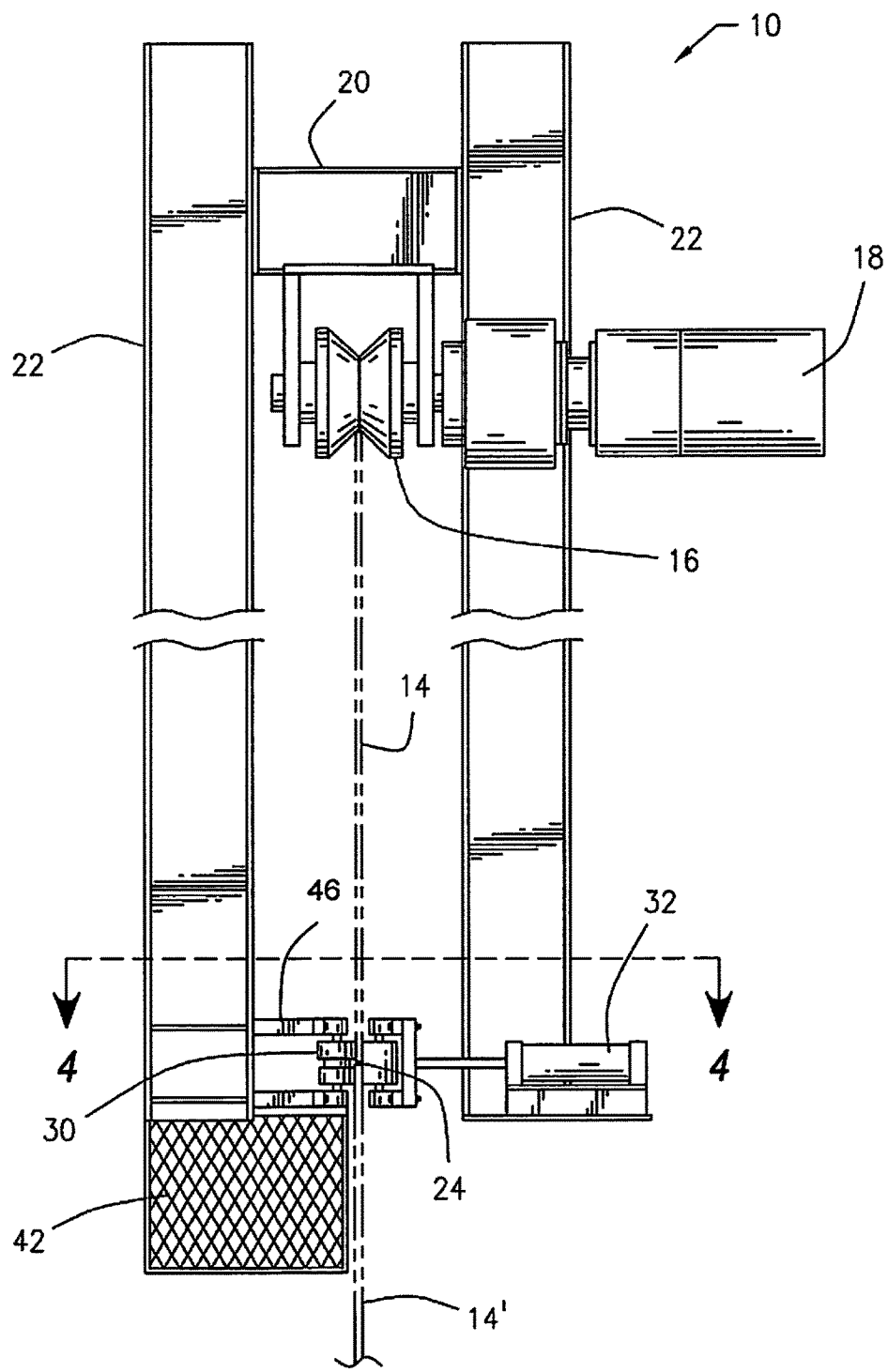
FIG. 2 is the device of FIG. 1 shown in cross section along line 2-2 of FIG. 1.
Figure 3:
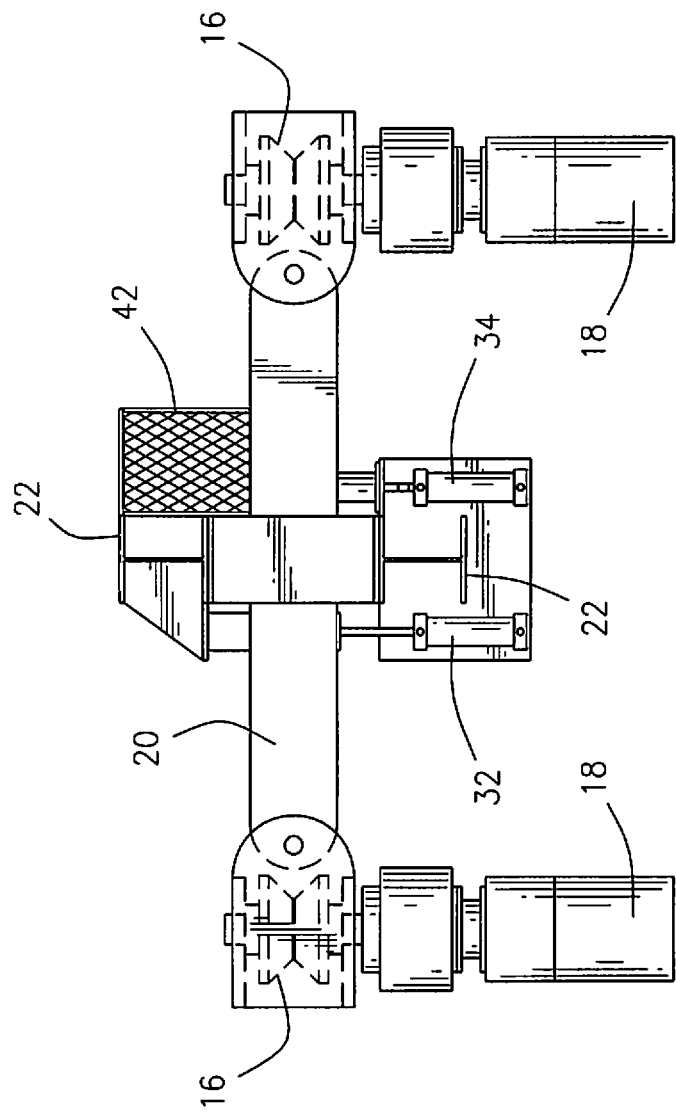
FIG. 3 is a top plan view of the drive mechanism taken along line 3-3 of FIG. 1.
Figure 6:
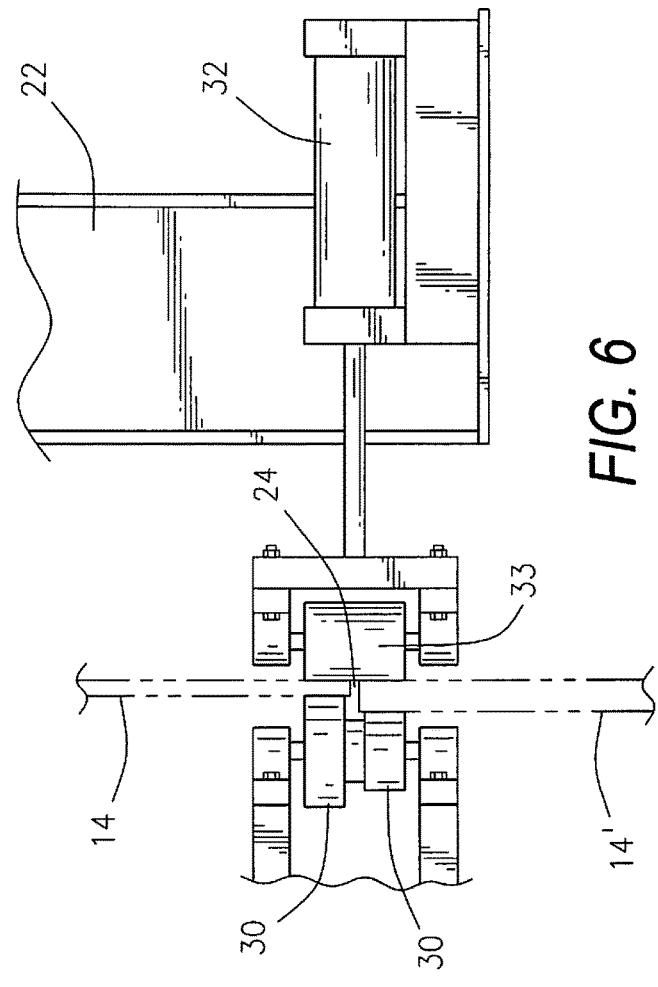
FIG. 6 is a side view of the aligning ram taken along line 6-6 of FIG. 4.

Referring now to FIGS. 2 and 6, the function of the alignment ram 32 is shown where the alignment ram 32 forces the plate 14 that is being added to the tank 12 into vertical alignment with the plates 14' located in the row directly below. In embodiments, the rollers 30 can be of various sizes and configured to cause the alignment of plates 14 and 14' to be flush inside (as illustrated in FIG. 6) or alternately flush outside, or the alignment can center plates 14 and 14' on a common vertical axis. By way of a non-limiting example, the rollers 30 may be a pair of rollers having different diameters than one another.

Figure 7A:
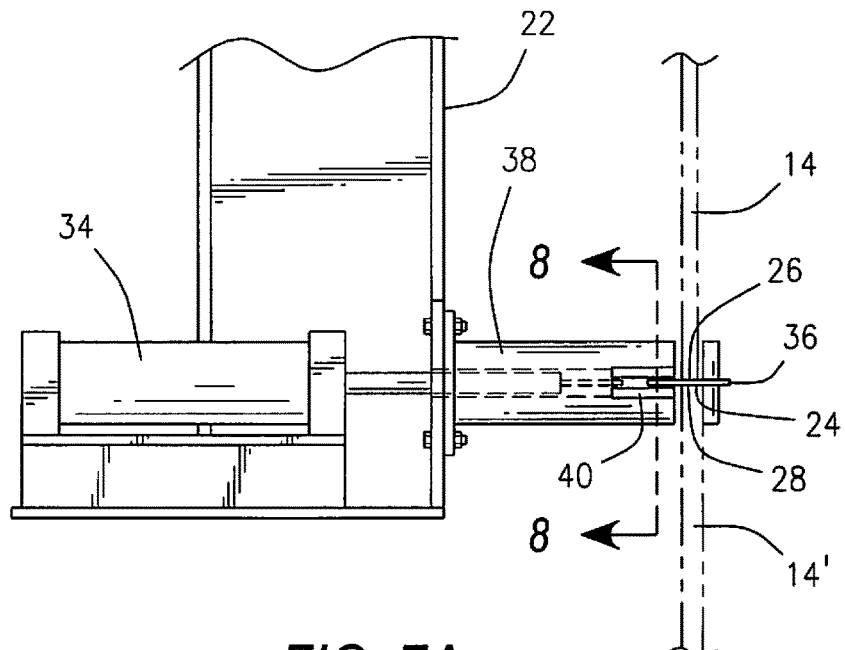
FIGS. 7A and 7B are enlarged views showing the function of the shim removing ram of FIG. 4.
Figure 7B:
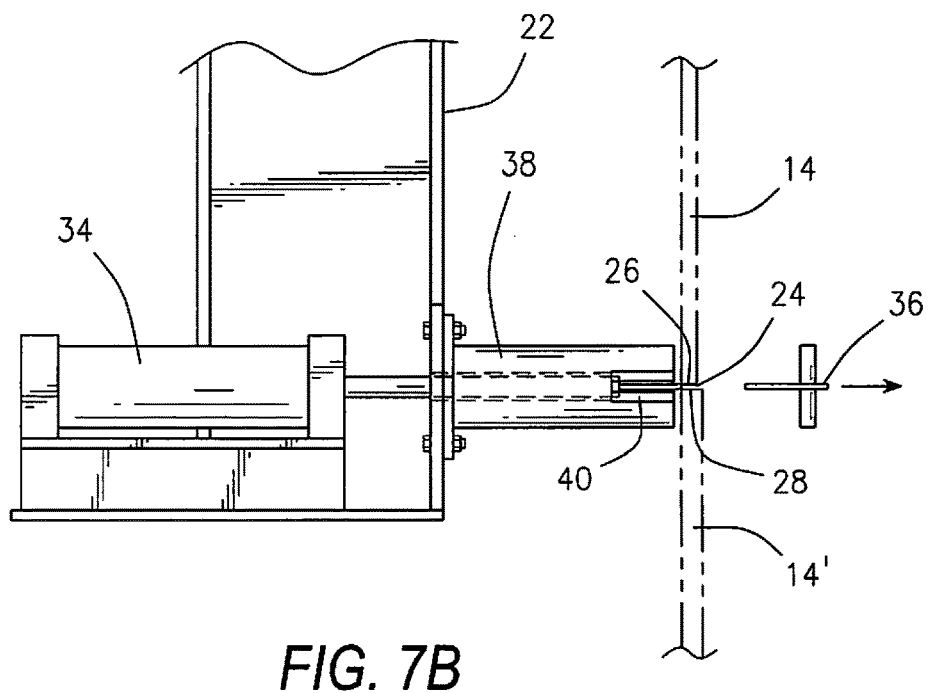
Figure 8:
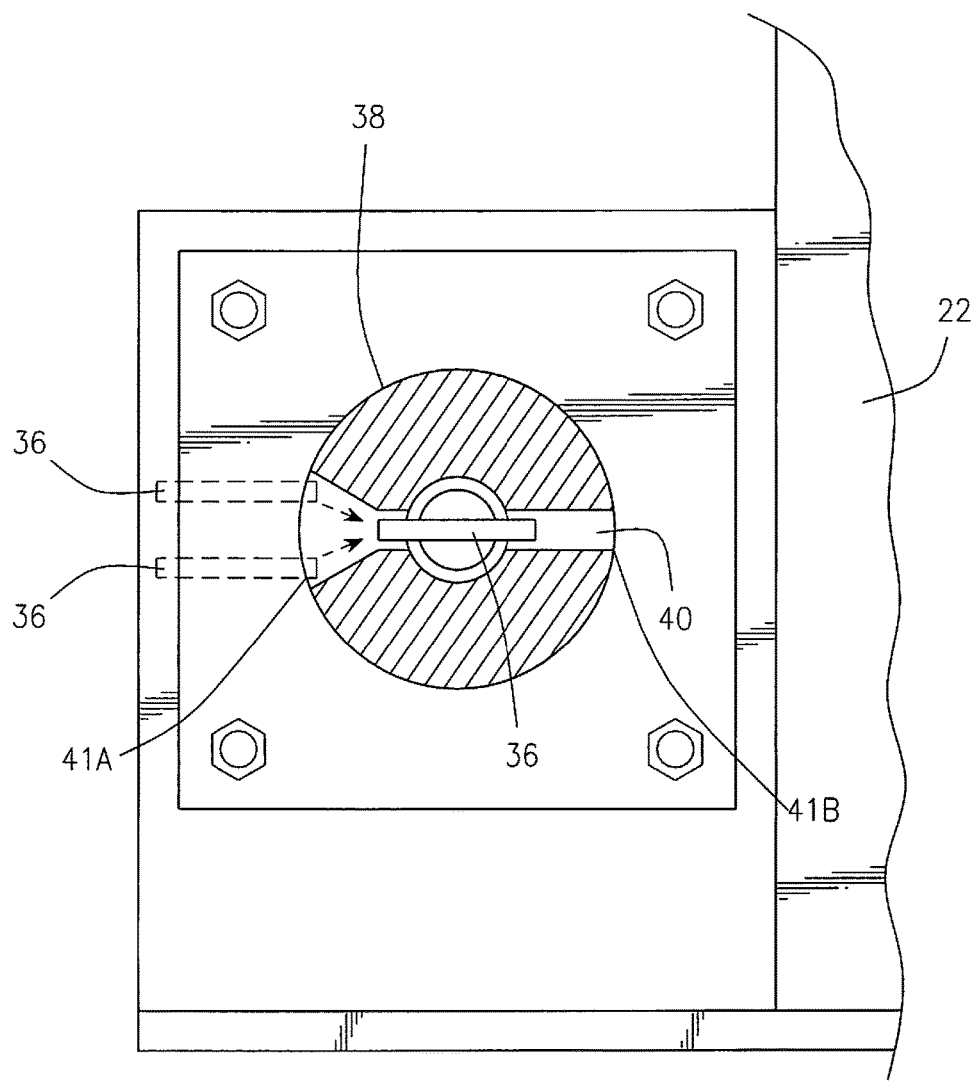
FIG. 8 is an enlarged view of the shim extractor alignment device taken along line 8-8 of FIG. 7A.

Referring to FIGS. 7A, 7B and 8, the function of the shim remover ram 34 is shown. FIG. 8 shows a shim extractor alignment device 38 that is provided associated with the shim remover ram 34. The shim extractor alignment device 38 guides the shim 36 into an alignment slot 40 that aligns the shim 36 vertically with the shim remover ram 34 as the device 10 moves horizontally. This allows the shim remover ram 34, when activated, to push against the shim 36 to push it out from between the gapped horizontal junction 24 located between the bottom 26 of the plate 14 that is being added to the tank 12 and the horizontal surface 28 of the plates 14' in the row directly below. This shim extractor alignment device 38 may be necessary since the shims 36 are often bent upward or downward and must be straightened by the shim extractor alignment device 38 to align the shims 36 vertically with the shim remover ram 34 before the shim remover ram 34 can push against the shim 36 to remove it and push it into a retention basket 42, as is illustrated in FIG. 7A and FIG. 7B. In embodiments, the alignment slot 40 is wider at the leading end 41A than at the trailing end 41B, and may be tapered, at least in part, toward the trailing end 41B.

Figure 9:
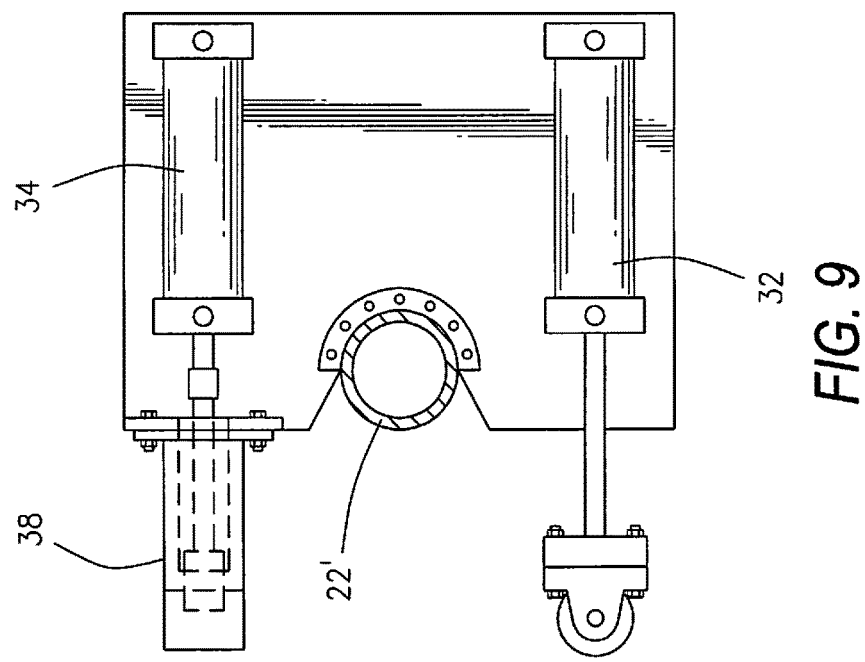
FIG. 9 is a plan view of the device of FIG. 1 mounted on an automatic girth welder.

Alternately, the device 10 may be mounted on a vertical beam 22' of an automatic girth welder of a kind known in the art, as shown in FIG. 9, and used in combination with the automatic girth welder.

While embodiments have been described with a certain degree of specificity, changes may be made in the details of construction and the arrangement of components without departing from the spirit and scope of this disclosure. The invention is not limited to the described embodiments, but is to be limited only by the scope of the attached claim or claims, including the full range of equivalents to which each element is entitled.

The invention claimed is:
1. A girth weld fitter comprising:
a plate alignment ram including a roller, the plate alignment ram connected toward a lower end of a vertical post that is configured for travel along a top edge of a row of tank plates;
a roller located opposite the plate alignment ram;
a shim remover ram connected toward the lower end of the vertical post and spaced apart in a horizontal direction from the plate alignment ram; and
a shim extractor located at one end of the shim remover ram, the shim extractor including:
a passageway to receive an end of the shim remover ram; and
a slot in communication with the passageway and sized to receive a shim.

2. A girth weld fitter according to claim 1, wherein the slot is wider at a leading end than at a trailing end of the slot.

3. A girth welder according to claim 2, wherein the slot at the leading end is tapered toward the trailing end of the slot.

4. A girth weld fitter according to claim 1, further comprising:
a basket located opposite the shim remover ram.

5. A girth weld fitter according to claim 1, further comprising a block containing the roller located opposite the plate alignment ram.

6. A girth weld fitter according to claim 1, wherein the roller located opposite the plate alignment ram includes a pair of rollers having different diameters than one another.

7. A girth weld fitter according to claim 1, further comprising a block containing the roller of the plate alignment ram.

8. A girth weld fitter according to claim 1, wherein the vertical post is part of a frame including at least one powered roller configured for travel along the top edge of the row of tank plates.

9. A girth weld fitter comprising:
a shim remover ram connected toward a lower end of a vertical post that is configured for travel along a top edge of a row of tank plates; and
a shim extractor located at one end of the shim remover ram, the shim extractor including:
a passageway to receive an end of the shim remover ram; and
a slot in communication with the passageway and sized to receive a shim.

10. A girth weld fitter according to claim 9 wherein the slot is wider at a leading end than at a trailing end of the slot.

11. A girth welder according to claim 10, wherein the slot at the leading end is tapered toward the trailing end of the slot.

12. A girth weld fitter according to claim 9, further comprising:
a basket located opposite the shim remover ram.

13. A girth weld fitter according to claim 9, further comprising:
a plate alignment ram including a roller, the plate alignment ram connected toward the lower end of the vertical post and spaced apart in a horizontal direction from the shim remover ram; and
a roller located opposite the plate alignment ram.

14. A girth weld fitter according to claim 13, further comprising a block containing at least one of said rollers.

15. A girth weld fitter according to claim 13, wherein the roller located opposite the plate alignment ram includes a pair of rollers having different diameters than one another.

16. A girth weld fitter comprising:
a plate alignment ram including a roller, the plate alignment ram connected toward a lower end of a vertical post that is configured for travel along a top edge of a row of tank plates;
a roller located opposite the plate alignment ram;
a shim remover ram connected toward the lower end of the vertical post and spaced apart in a horizontal direction from the plate alignment ram; and
a shim extractor located at one end of the shim remover ram, the shim extractor including:
a passageway to receive an end of the shim remover ram; and
a slot in communication with the passageway and sized to receive a shim, the slot being wider at a leading end than at a trailing end of the slot.

17. A girth weld fitter comprising:
a shim extractor ram connected toward a lower end of a vertical post that is configured for travel along a top edge of a row of tank plates; and
a shim extractor located at one end of the shim remover ram, the shim extractor including:
a passageway to receive an end of the shim remover ram; and
a slot in communication with the passageway and sized to receive a shim, the slot being wider at a leading end than at a trailing end of the slot.

18. A girth weld fitter comprising:
a plate alignment ram including a roller connected toward a lower end of a vertical post that is configured for travel along a top edge of a row of tank plates;
a roller located opposite the plate alignment ram;
a shim remover ram connected toward the lower end of the vertical post and spaced apart in a horizontal direction from the plate alignment ram; and
a shim extractor located at one end of the shim remover ram including a slot sized to receive a shim, the slot being wider at a leading end than at a trailing end of the slot; and
a basket located opposite the shim remover ram.

19. A girth weld fitter according to claim 18, wherein the basket is configured to catch removed shims.

* * * * *